United States Patent [19]

Richardson et al.

[11] 4,147,618
[45] Apr. 3, 1979

[54] METHOD AND APPARATUS FOR MEASURING PRODUCT CONTENTS

[75] Inventors: Carl Richardson, Bedford; Philip A. Wiley, Boxboro, both of Mass.

[73] Assignee: Bedford Engineering Corporation, Bedford, Mass.

[21] Appl. No.: 777,436

[22] Filed: Mar. 14, 1977

[51] Int. Cl.² .......................... B07C 5/16; B07C 5/344
[52] U.S. Cl. ................................... 209/589; 209/592; 250/272; 250/273
[58] Field of Search ............................ 209/111.5, 121; 250/272, 273, 277, 278, 279, 358 R, 359, 360, 308

[56] References Cited

U.S. PATENT DOCUMENTS

| 3,361,911 | 1/1968 | Kowalczyuski | 250/272 |
| 3,629,586 | 12/1971 | Giles | 250/359 |
| 3,662,882 | 5/1972 | Obermayer | 209/111.5 |
| 3,708,064 | 1/1973 | Schepler et al. | 250/360 X |

*Primary Examiner*—Robert B. Reeves
*Assistant Examiner*—Joseph J. Rolla
*Attorney, Agent, or Firm*—Schiller & Pandiscio

[57] ABSTRACT

An improved apparatus for and method of measuring the mass of the contents of a product is described, in which the mass of the contents of the product is relatively small compared to the mass of the entire product. The products are sequentially conveyed to an inspection station where preferably a predetermined portion of the volume of the product (which includes at least a portion of the volume of the contents) is substantially instantaneously irradiated with a beam of radiation and preferably only scattered radiation from the contents of the product thus irradiated is detected to provide an electrical signal whose magnitude is representative of the mass of the contents of the product. The products can then be sorted in accordance with the measured mass of their contents.

24 Claims, 5 Drawing Figures

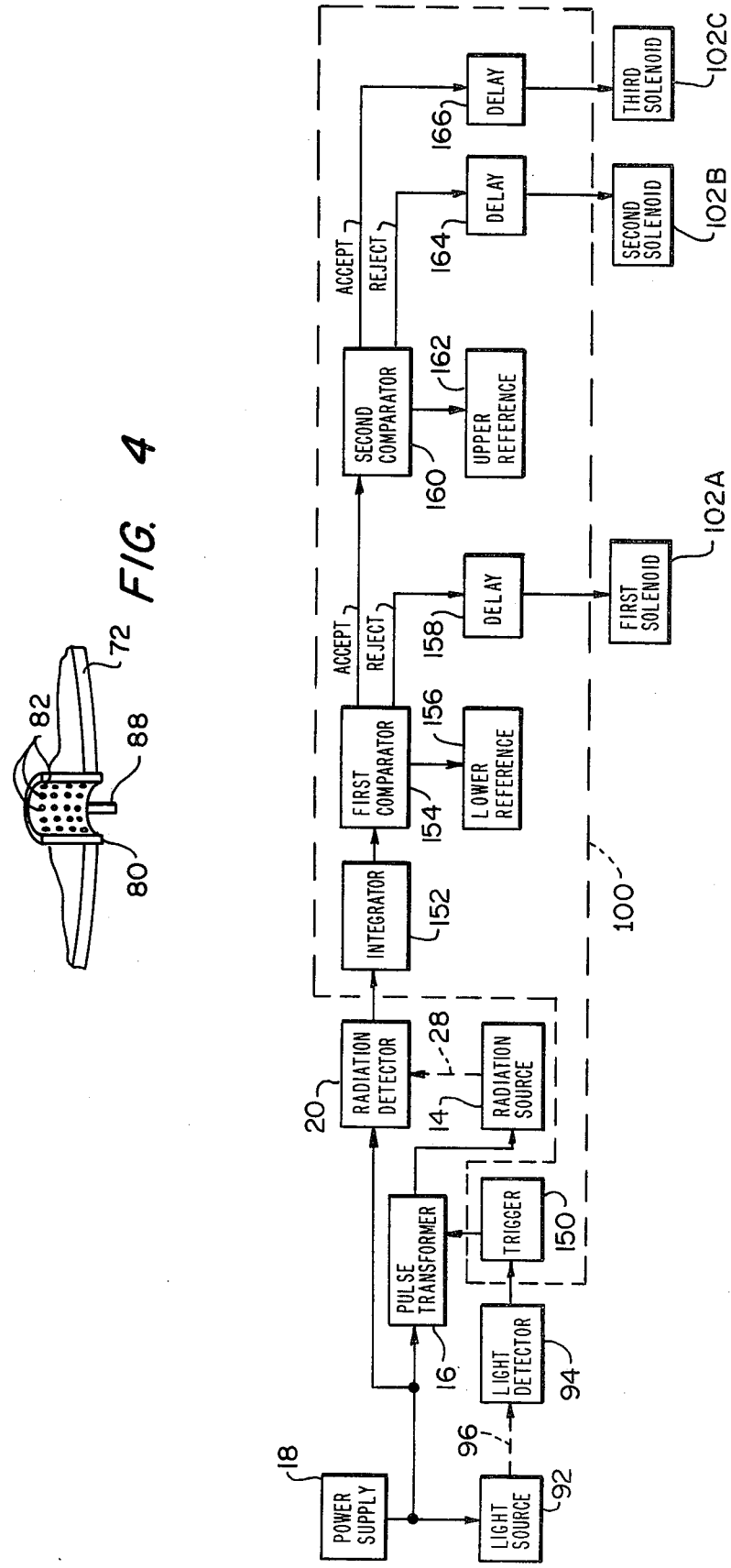

METHOD AND APPARATUS FOR MEASURING PRODUCT CONTENTS

This invention relates to the classification of products in accordance with the mass of their contents and more particularly to the measurement of the mass of the contents of products by scattered radiation analysis and the sorting of such products in accordance with these measurements.

Various systems are known for measuring the amount of material present in a container of a particular product which is mass-produced. One type of system which determines the amount of material by measuring its volume includes a source of electro-magnetic radiation typically gamma rays, for providing a beam which is used to scan a product from one end to the other, and a detector (positioned on the other side of the product) which is sensitive to the radiation received from the scanned product. The radiation from the source which scans the product is absorbed by the product in proportion to the density of the material. The magnitude of the radiation received by the detector is thus inversely related to the density of the particular area of the container to which the scannning beam is directed. Thus, for example, when using such a system to measure the volumetric amount of powder propellant in ammunition cartridges, if a cartridge being measured is completely full, the radiation received by the detector will remain approximately the same as the entire cartridge is scanned. If, however, the cartridge is only partially full or powder, as the beam scans the cartridge from an area below the level of the powder to above the level of the powder, the density will change and thus the amount of detected radiation will change. This technique however is not entirely satisfactory since the compactness of the powder may vary from cartridge to cartridge. Thus, for a loosely packed cartridge, there may be insufficient powder and similarly a densely packed cartridge may contain an excess amount.

Although there is some concern about overfilling a cartridge casing, the primary concern is with underfilling them, since a cartridge lacking sufficient powder might supply a weak explosion within a muzzle of a gun, so that the bullet head would not be propelled from the muzzle. If this occurred, there would then be a danger that the weapon would explode when the next cartridge was fired.

Although the amount of radiation received by the detectors would presumably vary with variations in the compactness of the powder, because the radiation must pass through a rather dense casing, these slight variations in powder density may not be detectable.

It, therefore, is preferred to measure the mass of the contents of such products since a measurement of the mass is not stringently dependent upon how densely packed the contents are. This can be accomplished by exposing the product to penetrating radiation, and measuring the amount of scattered radiation subsequently emitted by the product. The amount of measured scattered radiation is representative of the mass of the product. To the extent described, this technique is suitable for products where the mass of the contents of the product, such as medicinal capsules, is relatively large compared to the mass of the entire product this technique is satisfactory. However, a particular problem exists when measuring the entire mass of products such as ammunition cartridges where the mass of the contents is relatively small compared to the mass of the entire product. In such case, trying to determine the mass of the contents by measuring the scattered radiation from such a product and generating a signal representative of the amount of back-scattered radiation detected, yields a signal which has a relatively poor signal-to-noise ratio since variations in the mass of the contents provide relatively small variations in the signal generated.

It is an object of the present invention therefore to provide a method of and apparatus for classifying products according to the mass of their contents and which overcome the previous noted disadvantages.

It is another object of the present invention to provide a method of and apparatus for separately measuring the mass of the contents of products and sorting each product in accordance with the measurement.

Still another object of the present invention is to provide a method of and apparatus for classifying and sorting products quickly and automatically.

Yet another object of the present invention is to provide a method of and apparatus for measuring the mass of the contents of a product which is relatively small compared to the total mass of the product and which measurement has an improved signal-to-noise ratio.

These and other objects are achieved by a system and method of classifying products according to their mass wherein and whereby the products are conveyed along a predetermined path through an inspection station where a beam of radiation, directed transversely to the predetermined path, intercepts and penetrates each product individually. The preferred system and method of the present invention include the following two aspects: (1) only a predetermined portion of the volume of each product conveyed through the station is substantially instantaneously exposed to the beam of radiation (the predetermined portion of the exposed volume is less than the total volume of the product and includes at least a portion of the contents of the product); (2) only scattered radiation from portions of the contents of the product irradiated in this manner is detected and converted to an electrical signal which is representative of the mass of the exposed contents. The products can then each be sorted according to the measured mass of the contents.

Other features and many of the attendent advantages of the invention are disclosed in or rendered obvious by the following detailed description which is to be considered together with the accompanying drawings in which:

FIG. 4 is a partial perspective view taken along line 4—4 in FIG. 2; and

FIG. 5 is a block diagram of a complete system embodying the principles of the present invention.

In the drawings, like numerals are used to refer to like parts.

Figure 1:
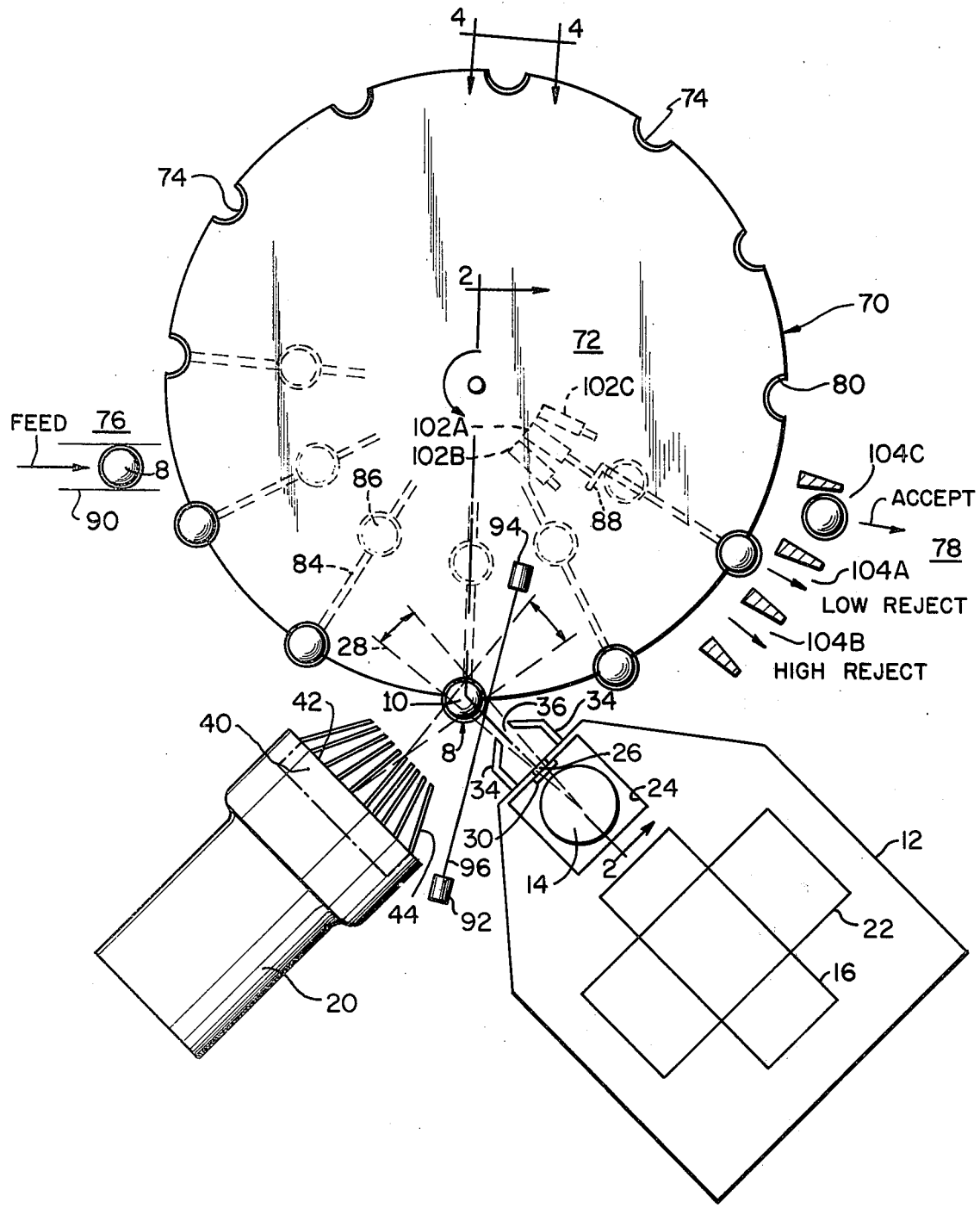
FIG. 1 shows a top view of a preferred embodiment of the present invention using an X-ray source of radiation.
Figure 2:
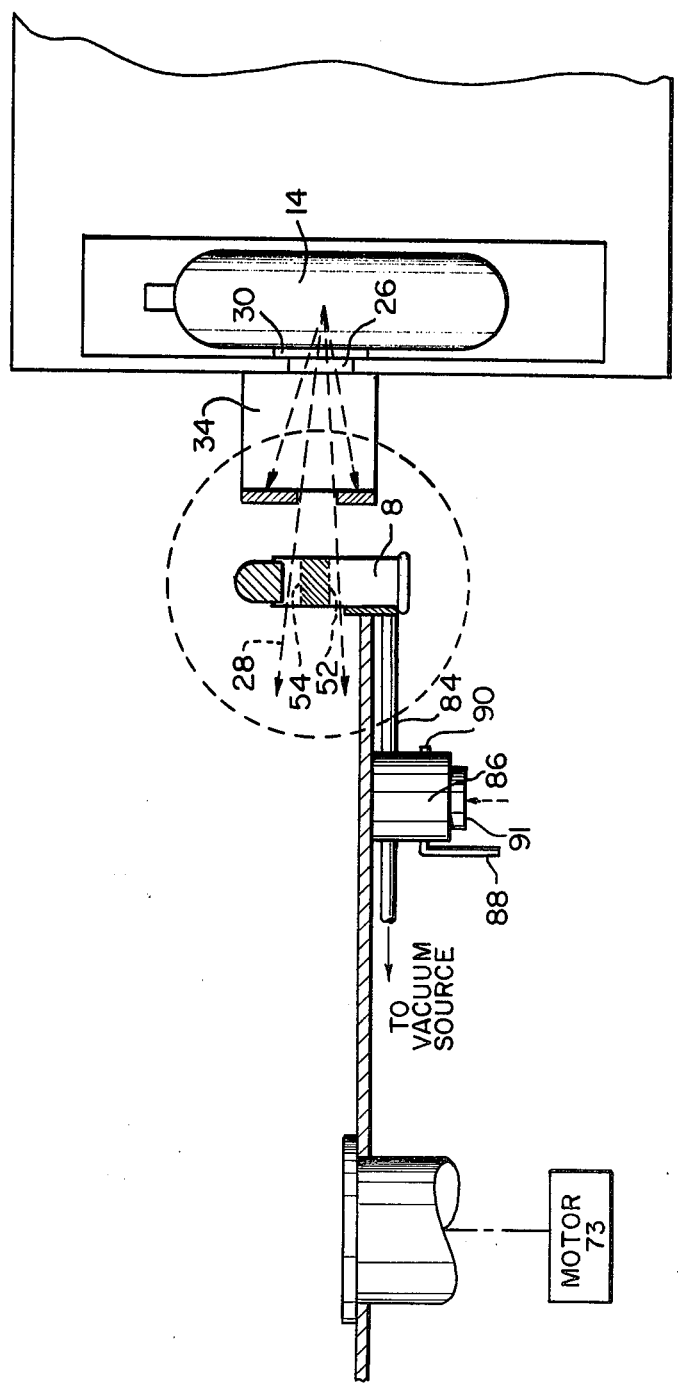
FIG. 2 shows a sectional view of the apparatus taken along line 2—2 in FIG. 1.

FIGS. 1, 2 and 4 illustrate one embodiment of an apparatus forming part of a system constructed in accordance with the present invention for determining whether the mass of the contents of a product is within predetermined limits. The apparatus is particularly adapted to determine the mass of the contents of a product, which mass is relatively small compared to the mass of the entire product. Thus, for example, the apparatus is useful in determining whether a sufficient amount of propellant powder is provided in individual ammunition cartridges. Accordingly, the description of the present invention is in part described in reference to such cartridges but it will be understood that it is equally applicable to other products whose contents comprise a relatively small mass compared to the mass of the entire product.

The apparatus shown in FIG. 1 comprises a housing 12 for supporting a source 14 of electromagnetic radiation, a pulse transformer 16 energized by the power supply 18 (shown in block form in FIG. 5) for energizing the source 14, and a radiation detector 20. Housing 12 includes a supporting structure 22 for supporting transformer 16, a chamber 24 in which is supported source 14, and an aperture 26, which is positioned so as to allow a beam 28 of radiation emitted by the source 14 to pass out from chamber 24 to the inspection point 10. Housing 12 is made of aluminum or other suitable material and lined with lead or a similar material or alloy which is opaque to radiation emitted by source 14. The latter is preferably any one of several devices for producing low-energy X-rays or low-energy gamma radiation, such as an X-ray tube (as illustrated, for example, in McGraw-Hill Encyclopedia of Science and Technology, McGraw-Hill Book Company, Inc., (1960), Vol. 14, pp 587-590) or a container filled with Americium 241, Gadolium 143 or Cobolt 57. In the embodiment shown in FIGS. 1 and 2, source 14 is an X-ray tube which is turned on selectively for a predetermined amount of time in order to irradiate the product 8 at point 10 with a predetermined amount of radiation. However, as described in greater detail hereinafter with reference to FIG. 3 source 14 can also be of a type which radiates the beam 28 continuously with the product 8 moving into the path of the beam and positioned at point 10 for a predetermined period of time. As is well known in the art, chamber 24 can be filled with oil in order to prevent overheating of source 14. A thin wall window 30, transparent to beam 28 and impermeable to the oil, is positioned over the aperture 26 so as to prevent oil leakage. One suitable material for the window is black nylon although other materials will be obvious to those skilled in the art.

The front of housing 12 is provided with a baffle and collimator assembly which includes two opposing plates 34, each attached in any suitable manner along one edge to housing 12 and countored and spaced from one another at the other end to form the slit aperture 36. The latter is aligned with aperture 26 and contoured to shape beam 28 so that the beam substantially conforms to a predetermined cross-sectional shape and illuminates a predetermined portion of the product 8 positioned at point 10 in accordance with the present invention as will be more apparent hereinafter. The plates 34 of the baffle assembly are opaque to the radiation of beam 28. Hence, any radiation emitted through aperture 26, toward either plate, will be blocked by that plate.

Detector 20 is positioned so as to measure radiation scattered by the product 8 positioned at or passing through point 10, when the product is irradiated by beam 28. Detector 20 preferably is located as close as possible to housing 12 and may be although not necessarily attached to the housing so as to provide a compact structure. The particular angular position of the detector 20 relative to the source 14 is not absolutely critical to the measurement of the mass of the product since side scattering of radiation occurs over a wide angle. However, as will be more evident hereinafter, the detector 20 is preferably positioned so that its axis is at an angle of approximately 90° to the direction of beam 28 in order to achieve optimum results. Detector 20 is sensitive to the radiation scattered by the product 8 at point 10 and, in the case of X-rays converts the radiation received into an electrical current or voltage signal. The magnitude of this signal is a function of the amount of scattered radiation received which in turn is a function of the mass of the product irradiated. Detector 20 may be any one or various devices such as a scintillation counter or an ionization detector, depending upon the nature of the radiation emitted by source 14. Preferably, detector 20 includes a photomultiplier tube (not specifically shown) operated in a current mode and positioned behind a sodium iodide scintillation crystal 40 which is mounted to the photomultiplier tube behind a window 42. The latter is made of a material which is transparent to the scattered radiation received from the product 8 at point 10. Preferably, window 42 is made of black nylon or other similar material. A collimator assembly 44 which is made of a material, such as lead or tungsten which will not excite or amplify the scattered radiation received from point 10 is positioned in front of the window 42 and shaped so as to pass scattered radiation from the product 8 positioned at point 10 and also to prevent any of the direct radiation of beam 28 from passing directly through the scintillation crystal 40. Preferably, although not necessarily, the collimator assembly 44 is shaped and contoured so as to have a limited angle of view of the product 8 positioned at point 10 so as to pass scattered radiation from only a selected portion of the product at point 10, as will be more evident hereinafter.

Figure 3:
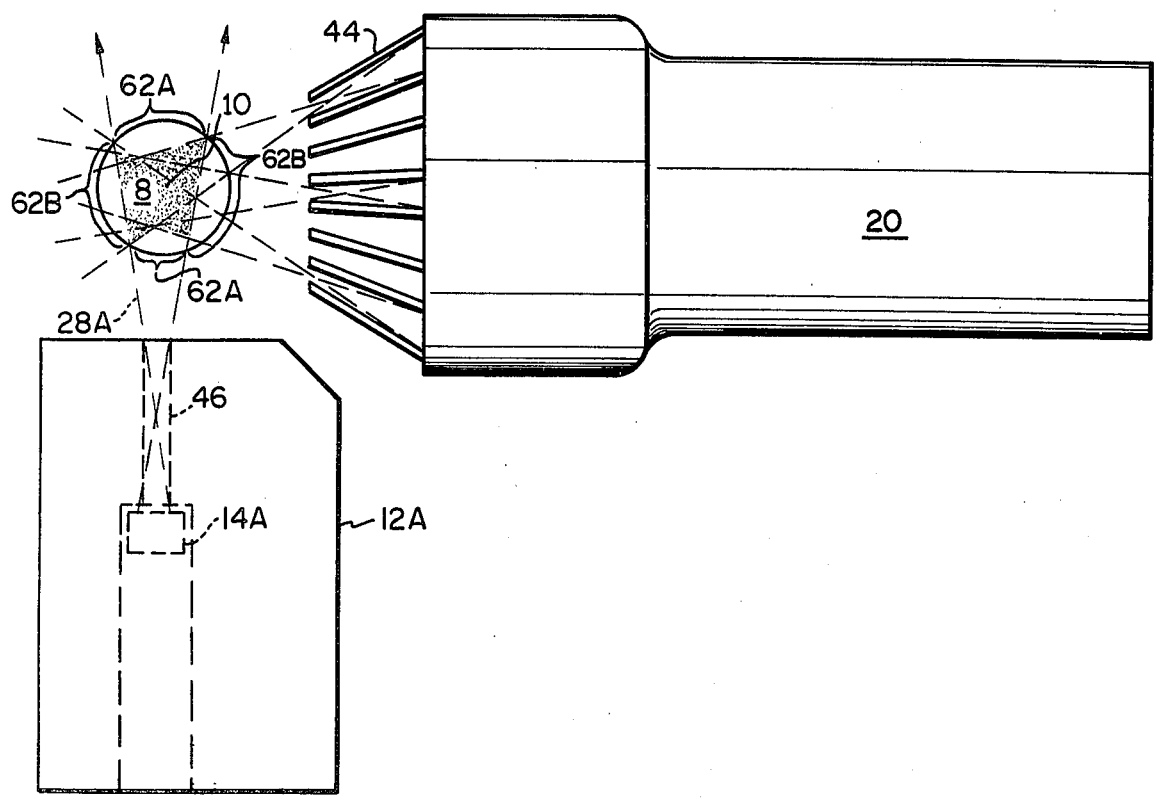
FIG. 3 shows a top view of a modified embodiment of the present invention using a gamma ray source of radiation.

FIG. 3 shows a modification of the embodiment of the present invention and is substantially the same as the embodiment shown in FIGS. 1 and 2, except that a low energy gamma ray source 14A, such as Cobalt 57 or Americium tube 41 has been substituted for the X-ray tube 14. Source 14A is placed within the housing 12A the latter being provided with an elongated aperture 46 so as to function as a collimator to define the shape of the beam 28A of gamma radiation. In such a situation the detector is turned on for a predetermined period of time while a product is exposed at the inspection point 10 or alternative means, such as a shutter (not shown) may be used to intercept the beam 28A in order to prevent the beam from passing through point 10 at all times, and for exposing each product for a predetermined period of time.

In accordance with the aspect of the present invention, beam 28 is provided with a predetermined cross-sectional shape so as to flood or expose only a select portion of the product 8 positioned at point 10.

More specifically, products of the type described are provided with a hollow portion filled with the contents of the product wherein the contents assume the shape of the hollow portion. In the case of ammunition cartridges 8 the casing and bullet head form a hollow substantially cylindrical chamber which contains the propellant powder. The cross-section of the beam 28 therefore can be shaped so as to substantially expose only that portion of the cartridge known to contain the powder, i.e. the hollow cylindrical chamber. Since the mass of the casing and bullet head can vary by a relatively large amount in comparison to the mass of the propellant powder, by not exposing those portions of the casing and the bullet head (which portions are known not to contain any powder) to the beam of radiation, the ratio of the mass of the powdered contents to the entire mass of the product exposed, i.e. the signal-to-noise ratio is increased.

Where the mass measurements of the entire contents of each product does not vary appreciably with density variations of the contents, this ratio can further be improved by shortening the vertical cross-sectional dimension of the radiation beam 28, so that it exposes only that portion of the product from just below where a minimum permissible level of the contents would be (shown as dotted line 52 in FIG. 2) to just above where a maximum permissible level of the contents would be (shown as dotted line 54 in FIG. 2).

In accordance with a second aspect of the present invention, the signal-to-noise ratio can also be improved, by designing the collimator 44 of the detector 20 so as to pass only that radiation scattered by the portions of the contents, (e.g. the powdered contents) exposed to the beam 28. Referring to FIG. 3, this is illustrated where cartridge 8 is irradiated by beam 28A exposing only those portions of the casing indicated at 62A and the powder therebetween. Since the remaining portions of the casing (as well as those portions above and below the beam, see FIG. 2) are not exposed to the beam they will provide little if any scattered radiation and therefore will not be included in the final mass measurement. Similarly, by positioning the detector 20 and designing the collimator 44 so as to substantially "look" only at scattered radiation from the powder exposed to the beam 28 and not those portions of the casing indicated at 62A, very little if any of the scattered radiation from these portions 62A will be received by the detector 20. Accordingly, the signal-to-noise ratio is improved by maximizing the ratio of the amount of scattered radiation received by the detector from the powdered contents to the total amount of scattered radiation received.

In order to achieve a maximum signal-to-noise ratio, the portions 62A of the casing of the product 8 should not overlap the portions 62B. This condition is most likely to occur when the source is oriented with respect to the detector so that the direction of the irradiated beam 28 is oriented at a 90° angle with respect to the direction of the "line of sight" or direction of view of the detector 20.

The detector 20 thus receives radiation scattered by a select portion of the product when the latter is irradiated by beam 28 or 28A and generates an electrical signal representative of the quantity of scattered radiation which it receives. By properly processing and evaluating the electrical signal provided by the detector, the mass of the contents of the product can easily be determined regardless of its density.

It will be appreciated therefore that the signal-to-noise ratio can be improved by either (1) exposing a select portion of the product 8 at point 10 known to contain a portion of the contents being measured and measuring the scattered radiation emitted from the product thus irradiated or, (2) detecting only scattered radiation emitted from that portion of the product known to contain the contents being measured. Optimum results occur by a combination of both.

Any one of various systems known to those skilled in the art may be provided for conveying products 8 sequentially to point 10 so that the mass measurement can be made. Further, any means may be provided for sorting the products in accordance with their measured mass.

For example, the transport system is shown in FIGS. 1 and 2 in the form of a carousel-type conveyor 70 which has particular utility for conveying products such as ammunition cartridges 8 to the inspection point 10 and subsequently away from this point after the mass measurement is made. Briefly, the carousel conveyor 70 comprises a rotatable turntable, shown schematically at 72, rotated by means such as motor 73, and having means for holding the cartridges at a predetermined radial distance from one another so that as the turntable rotates, only one cartridge is exposed to the beam 28 at a time. The means for holding the cartridges may comprise a plurality of semi-cylindrical slots 74 formed around the periphery of the turntable 72 and a flexible, elastic retaining belt (not shown) for holding each cartridge in a slot in a substantially rigid manner. With this arrangement, the cartridges can be individually, manually mounted in each of the slots 74 at loading point 76, which is clear of beam 28, and subsequently removed at the sorting point 78, also clear of beam 28, after the inspection of the cartridge is made.

Alternatively the means for holding each cartridge to the turntable may include vacuum means for holding the products to the periphery of the turntable 72. More particularly, referring to FIGS. 1, 2 and 4 each slot 74 is provided with a cartridge-receiving holder 80 provided with a plurality of small holes 82 through which air can be drawn into the tube 84. Each Cartridge 8 can be held by a corresponding holder by applying a vacuum through tube 84. Each tube 84 is provided with a pressure-release valve 86 which is normally in a closed position. Each valve 86 is suitably connected to a lever 88 which preferably extends in a vertical direction down from the turntable when valve 86 is in the closed position and is rotatable with the valve 86 about the pivot axis 90 so as to open the valve. Each tube 86 is suitably connected to a vacuum source (not shown) which provides a sufficient vacuum to each of the holders 80 so that the latter can hold a cartridge regardless of whether the other holders are holding similar cartridges so long as the valve 86 associated with the particular holder is closed. When the associated valve is open air is drawn through the port 91 of the valve, preventing the application of a vacuum to the holes 82 of the corresponding holder, resulting in the cartridge being released. It will be appreciated that each holder 80, tube 84, valve 86 and lever 88 as well as the turntable 72 itself, are all suitably positioned so as to be outside of and will not be exposed to the beam 28 nor will any appreciable amount of scattered radiation from them be detected by the detector 20.

Other types of rotating turntables including vacuum means for holding products along its periphery are known, for example see U.S. Pat. Nos. 3,366,236, 3,709,598 and 3,838,766. Other conveying means are well known in the art. For example, each cartridge can be conveyed on a chain link conveyor. The latter type of conveying device is capable of transporting up to 1200 cartridges a minute through the inspection point 10. This latter type of device is preferred with the X-ray embodiment of FIGS. 1 and 2. When operating at such a high rate of inspection the conveyor may be operated so that it moves at a constant speed whereby the cartridges pass one at a time through the inspection point 10 at preselected time intervals. Alternatively however, where slower inspection times are required such as those required with the low level energy sources provided in the embodiment of FIG. 3, the conveying means may be operated so that it moves the individual cartridges intermittently, indexing a new cartridge into position at point 10, each time the conveyor is operated. In the latter situation motor 73 is preferably a stepping motor, such motors being well known in the art.

The cartridges may be automatically attached to the turntable at the loading point 76. For example, the cartridges may be fed through a suitable feeding mechanism 90, shown schematically in FIG. 1 at point 76 which may be a spring loaded magazine which spring biases loaded cartridges against the edge of the turntable. As the turntable rotates, each slot 74 contacts a cartridge and the vacuum is applied through the holder 80 to hold the particular cartridge to the turntable until the cartridge has been inspected.

A detector system (see FIG. 1) is provided for determining when a cartridge is positioned at point 10. This system comprises a light source 92 and a light detector 94 disposed at opposite sides of the path travelled by the cartridges 8 through the inspection point 10. The detector operates in a manner well known to those skilled in the art; light source 92 directs a light beam 96 toward light detector 94. When a cartridge moves into position at point 10 it interrupts beam 96, so that the light detector 94 provides a signal to a control circuit 100 (see FIG. 5) which in turn triggers the operation of the source 14.

Each cartridge which passes through point 10 and is measured can subsequently be collected in three separate groups as follows: (1) cartridges containing powder whose mass is within some predetermined range; (2) cartridges containing powder whose mass is below the predetermined range; and (3) cartridges containing powder whose mass is above the predetermined range.

When the individual cartridges are loaded, for example, on the conveying system manually, the sorting may also be accomplished manually. However, it would be appreciated that the sorting system may also be automatic. For example, referring to FIG. 1, automatic sorting means are provided in the form of three solenoids 102A, 102B and 102C. Each are positioned below the turntable 72 and are selectively energizable so that their shafts extend into the path of the individual levers 88 as the latter rotate with the turntable 72. The levers pivot when contacting the shaft of an energized solenoid causing the corresponding valve 86 to open thereby releasing the cartridge. Three separate chutes 104A, 104B and 104C are provided for receiving cartridges released by the energization of the corresponding solenoids 102A, 102B and 102C. The chutes respectively lead to three bins which correspond to the three classification groups.

Referring to FIG. 5, the system is described for carrying out the measurement of the mass of the powder of each cartridge and subsequently classifying them in accordance with that mass measurement. Specifically, the power supply 18 is connected to the pulse transformer 16, radiation detector 20 and light source 92. Light detector 94, coupled to the light source 92 by the beam 96, provides an output to a trigger circuit 150. The output of trigger circuit 150 is connected to pulse transformer 16 which in turn is connected to radiation source 14. Trigger circuits are well known to those skilled in the art. Trigger circuit 150 operates such that when the light beam 96 is broken and the detector 94 provides an output to the trigger, the latter will provide an output pulse to the transformer 16 which causes source 14 to energize briefly, whereby a beam 28 is generated for a brief time, e.g., 5 miliseconds for the X-ray tube. Detector 20 detects radiation scattered by the cartridge positioned at point 10 in accordance with the present invention. The detector 20 preferably operates in a current mode and hence will provide a current output which contains energy, the magnitude of which is indicative of the mass of the powder of the cartridge positioned at point 10. In a manner well known in the art this current output signal is passed to an integrator 152 and integrated to provide a signal whose magnitude represents the amount of radiation energy received by detector 20 and thus a measure of the mass of the powder of the cartridge. Integrators are well known in the art and thus will not be described in detail. For example, the integrator can include an RC circuit in which the amount of energy in the output signal from detector 20 is stored in a capacitor and this amount of energy is measured in the form of a voltage. The signal output of integrator 152 is connected to the input of a first comparator 154. This signal is compared to a lower reference signal provided by a lower reference source 156. The lower references signal is representative of the lower limit of the range of acceptable masses of the contents of each cartridge. It is noted that in accordance with the preferred form of the present invention this lower reference signal should represent little if any mass of any environmental structure, i.e. any portion of the conveying system or the casing and bullet head of the cartridge since in accordance with the present invention only a selected portion of the cartridge is exposed by a beam 28 while only the scattered radiation from a predetermined portion of the cartridge is actually detected. Where, however, the detector 20 receives scattered radiation from all portions of the cartridge exposed to radiation, e.g., including portions 62A of the casing, the lower reference signal would include the average expected mass of those portions other than the contents exposed to the beam. This lower reference signal is generated in a suitable manner, e.g. by dropping off a suitable voltage or current from a variable voltage or current divider network.

If the magnitude of the signal provided by integrator 152 is less than the lower reference signal the output of the first comparator 154 is a reject signal. If, however, a signal provided by integrator 152 is equal to or above the lower reference signal the output of the first comparator is an accept signal. The reject signal can be indicated to the operator in the form of an individual indication light (not shown) or suitably delayed by time delay 158 so as to energize solenoid 102A in order to release the cartridge from the carousel when the cartridge is adjacent the chute 104A leading to the bin receiving those cartridges with an insufficient amount of powder.

If the first comparator 154 provides an accept signal, the latter is transmitted to a second comparator 160. The second comparator 160 compares the accept signal input with an upper reference signal from an upper reference signal source 162. The upper reference signal provided by source 162 is representative of the maximum amount of mass of powder contained in any cartridge including the average mass of any environmental structure. If the magnitude of the accept input signal to the second comparator 160 is above the upper reference signal, comparator 160 will provide a reject output signal to a suitable visual indication (not shown) for the operator or to time delay 164 which in turn energizes solenoid 102B so as to release the cartridge when it is adjacent chute 104B leading to the bin receiving those cartridges with an excess amount of powder.

On the other hand, if the accept signal input to the second comparator 160 is below the upper reference signal provided by the source 162 this will be indicated to the operator as an acceptable cartridge. Alternatively, as shown, the accept signal provided by the second comparator 160 can be applied to a third delay 166 which in turn energizes solenoid 102C so as to release the cartridge when it is adjacent chute 104C leading to the bin receiving acceptable cartridges. It will be appreciated that where an automatic sorting system is provided and several cartridges are positioned between the current cartridge being inspected and the cartridge to be sorted, suitable means other than the delays 158, 162 and 166 can be used. For example, electrical storage means such as a storage register can be used to store the classification of a particular cartridge until it is ready to be sorted. The number of signals stored in such a shift register will be equal to the number of cartridges between the cartridge being inspected and the cartridge to be sorted. These signals are stored and shifted one by one so that the cartridge at sorting point 78 can be properly sorted. Alternatively, mechanical means such as a camming mechanism may be provided which is adapted to follow each cartridge and release the cartridge into the appropriate chute.

As is obvious from the foregoing description to a person skilled in the art, the present invention is capable of quickly and accurately measuring the mass of various products, particularly ammunition cartridges. It has been found that such ammunition cartridges can be tested at a rate up to 20 per second utilizing the concepts of the present invention. Further, the invention has the advantage that a low energy source can be utilized without interferring with the personnel in the area as well as the products being tested. It has been determined that a cartridge measuring system of the type described in FIGS. 1 and 2 should comprise an X-ray tube operating at from about 40 to 80 kilovolts peak (KVP). A lower X-ray tube kilovoltage will result in the cartridge self-absorbing the scattered radiation.

Other advantages and possible modifications of the invention can be made without departing from the invention.

Since certain other changes may be made in the above-described apparatus and method without departing from the scope of the invention herein involved, it is intended that all matter contained in the above-description or shown in the accompanying drawing shall be interpreted in an illustrative and not in a limiting sense.

What is claimed is:

1. A system for measuring the mass of the contents of a product, the mass of said contents being small relative to the total mass of said product, said system comprising:
    means for conveying products along a predetermined path through an inspection station;
    irradiation means disposed adjacent said inspection station for directing a beam of penetrating radiation transversely to said path so that at least a portion of the volume of each product conveyed through said station is substantially instantaneously exposed to said beam of penetrating radiation;
    radiation detector means positioned adjacent said station for producing an electrical signal representative substantially only of the amount of received radiation which is scattered by the contents of the irradiated product; and
    means for determining the mass of the contents of each product irradiated by said beam as a function of said electrical signal.

2. A system in accordance with claim 1, wherein said detector means is adapted so as to respond substantially only to radiation scattered by the contents of said irradiated product.

3. A system in accordance with claim 1, wherein said detector means comprises means for limiting the scattered radiation received from said product irradiated by said penetrating beam to substantially only radiation scattered by the contents of said product.

4. A system in accordance with claim 1 wherein said means for conveying products comprises means for indexing said products one at a time through said inspection station.

5. A system in accordance with claim 1 wherein said means for conveying products comprises means for moving said products without stopping through said inspection station.

6. A system in accordance with claim 1 wherein said source of radiation emits radiation in the X-ray region of the electromagnetic spectrum.

7. A system in accordance with claim 1, wherein said radiation means comprises means for shaping said penetrating beam so that said beam of radiation exposes a predetermined portion of the volume of said product, said predetermined portion of said volume being less than the total volume of said product and including at least a portion of the product presumed to contain said contents.

8. A system in accordance with claim 7, wherein said means for shaping said penetrating beam comprises a collinating means.

9. A system in accordance with claim 7, wherein said predetermined portion comprises only the portions of the product presumed to contain said contents from just below the minimum acceptable level of said contents to just above the maximum acceptable level of said contents.

10. A system in accordance with claim 7, wherein detector means comprises means for limiting the scattered radiation received from said product irradiated by said penetrating beam to substantially only radiation scattered by the contents of said product.

11. A system in accordance with claim 10, wherein said detector means comprises a photomultiplier tube and said means for limiting the scattered radiation received from said product includes means for collimating radiation scattered by said contents to said photomultiplier tube.

12. A system in accordance with claim 1, wherein said detector means is positioned relative to the direction of said beam so as to measure transverse scattered radiation from said product.

13. A system in accordance with claim 12, wherein said detector means is positioned so as to receive radiation scattered substantially 90° with respect to the direction of said beam.

14. A system in accordance with claim 1 wherein said irradiating means comprises a low energy source of said radiation.

15. A system in accordance with claim 14 wherein said source of radiation emits gamma radiation.

16. A system in accordance with claim 1 wherein said means for determining the mass includes means for determining whether said mass is within a predetermined range.

17. A system in accordance with claim 16 further including sorting means for sorting those porducts whose mass is within said predetermined range from those products whose mass is outside of said predetermined range.

18. A method of measuring the mass of the contents of a product, the mass of said contents being small relative to the total mass of said product, said method comprising the steps of:
conveying said products along a predetermined path through an inspection station;
directing a beam of penetrating radiation transversely to said path so that at least a portion of the volume of each product conveyed through said station is substantially instantaneously exposed to said beam of penetrating radiation;
detecting substantially only radiation scattered by the contents of each of said products when each product is irradiated by said beam;
generating an electrical signal representative of the scattered radiation detected; and
determining the mass of each product irradiated by said beam as a function of said electrical signal.

19. A method in accordance with claim 18, wherein detecting substantially only radiation scattered by said contents includes the step of collimating only scattered radiation from said contents.

20. A method in accordance with claim 18, wherein directing said beam of penetrating radiation includes the step of shaping said beam so that said beam exposes a predetermined portion of the volume of said product, said predetermined portion of said volume being less than the total volume of said product and including at least a portion of the product presumed to contain said contents.

21. A method in accordance with claim 20, wherein said predetermined portion of said product exposed to said beam includes only the portions of said beam presumed to contain said contents from just below the minimum acceptable level of said cotents to just above the maximum acceptable level of said contents.

22. A method in accordance with claim 20, wherein detecting substantially only radiation scattered by said contents includes the step of collimating only scattered radiation from said contents.

23. A method in accordance with claim 18, wherein detecting substantially only radiation scattered by said contents includes detecting radiation scattered in a direction transverse to the direction of said beam.

24. A method in accordance with claim 23 wherein the direction of said scattered radiation is 90° with respect to the direction of said beam.

* * * * *

UNITED STATES PATENT AND TRADEMARK OFFICE
CERTIFICATE OF CORRECTION

PATENT NO. : 4147618
DATED : April 3, 1979
INVENTOR(S) : Carl Richardson and Philip A. Wiley It is certified that error appears in the above-identified patent and that said Letters Patent are hereby corrected as shown below:

Claim 8, column 10, line 40, "collinating" should be -- collimating --.

Claim 17, column 11, line 8, "porducts" should be -- products --.

Claim 21, column 12, line 17, "cotents" should be -- contents --.

Signed and Sealed this

Tenth Day of July 1979

[SEAL]

Attest:

*Attesting Officer*

LUTRELLE F. PARKER
*Acting Commissioner of Patents and Trademarks*